United States Patent
Daynes et al.

(10) Patent No.: US 6,931,638 B2
(45) Date of Patent: Aug. 16, 2005

(54) METHOD AND APPARATUS TO FACILITATE SHARING OPTIMIZED INSTRUCTION CODE IN A MULTITASKING VIRTUAL MACHINE

(75) Inventors: Laurent P. Daynes, Sunnyvale, CA (US); Grzegorz J. Czajkowski, Mountain View, CA (US)

(73) Assignee: Sun Microsystems, Inc, Santa Clara, CA (US)

( * ) Notice: Subject to any disclaimer, the term of this patent is extended or adjusted under 35 U.S.C. 154(b) by 767 days.

(21) Appl. No.: 10/043,801

(22) Filed: Jan. 10, 2002

(65) Prior Publication Data
US 2002/0133638 A1 Sep. 19, 2002

Related U.S. Application Data (60) Provisional application No. 60/276,409, filed on Mar. 15, 2001.

(51) Int. Cl.[7] .............................. G06F 9/455; G06F 9/44
(52) U.S. Cl. ........................... 718/1; 717/118; 717/148; 717/166
(58) Field of Search ............................. 718/1, 100, 102; 717/118, 140, 141, 147, 148, 166; 719/331, 332

(56) References Cited

U.S. PATENT DOCUMENTS

| | | | | |
|---|---|---|---|---|
| 5,999,732 A | * | 12/1999 | Bak et al. | 717/148 |
| 6,128,771 A | * | 10/2000 | Tock et al. | 717/111 |
| 6,195,774 B1 | * | 2/2001 | Jacobson | 714/727 |
| 6,442,752 B1 | * | 8/2002 | Jennings et al. | 717/162 |
| 6,481,006 B1 | * | 11/2002 | Blandy et al. | 717/139 |
| 6,574,673 B1 | * | 6/2003 | Hari et al. | 719/310 |
| 6,738,977 B1 | * | 5/2004 | Berry et al. | 719/332 |
| 6,823,509 B2 | * | 11/2004 | Webb | 718/1 |
| 6,851,111 B2 | * | 2/2005 | McGuire et al. | 717/166 |
| 6,851,112 B1 | * | 2/2005 | Chapman | 718/1 |

* cited by examiner

Primary Examiner—Majid Banankhah
(74) Attorney, Agent, or Firm—Park, Vaughan & Fleming, LLP; Edward S. Grundler (57) ABSTRACT

A method is provided that enables native code, dynamically compiled from platform-independent code by one task of a multitasking virtual machine, to be used by other tasks. The system interprets the platform-independent code of a method for a threshold number of interpretations, and then produces class initialization dependent (CID) native code. The runtime of the system guarantees that a task uses CID code of a method only when all of the classes of an initialized set associated with the CID code have been initialized by the task, and otherwise, interprets the platform-independent code of the method. This allows the compiler to avoid generating class initialization barriers for classes from the initialized set. After a threshold number of failures to execute the CID code of a method, task re-entrant code is generated to replace the interpretation of its platform-independent code.

52 Claims, 8 Drawing Sheets

METHOD AND APPARATUS TO FACILITATE SHARING OPTIMIZED INSTRUCTION CODE IN A MULTITASKING VIRTUAL MACHINE

RELATED APPLICATION

This application hereby claims priority under 35 U.S.C. §119 to a Provisional Patent Application entitled, "The Design of MVM—a Multitasking Virtual Machine," filed Mar. 15, 2001 by inventors Grzegorz J. Czajkowski and Laurent P. Daynes (Application No. 60/276,409).

The subject matter of this application is related to the subject matter in a co-pending non-provisional application by the same inventors as the instant application entitled, "Method and Apparatus For Class Initialization Barriers in Multitasking Virtual Machines," having Ser. No. 09/975,145, and filing date Oct. 9, 2001.

BACKGROUND

1. Field of the Invention

The present invention relates to computer instruction code. More specifically, the present invention relates to a method and an apparatus that facilitates sharing computer instruction code between programs in a multitasking virtual machine.

2. Related Art

Computer programs written in languages such as JAVA™ are compiled into a platform-independent code, which is executed on a virtual machine, such as the JAVA VIRTUAL MACHINE (JVM). A program that has been compiled into a platform-independent code has the advantage that it can execute on a virtual machine regardless of the underlying central processing unit and native code. The terms JAVA, JVM and JAVA VIRTUAL MACHINE are trademarks of SUN Microsystems, Inc. of Palo Alto, Calif.

A virtual machine typically includes an interpreter, which interprets the platform-independent code into native code to perform the desired operations. Interpreting the platform-independent code is an inherently slow operation; therefore, many virtual machines also include a dynamic compiler, which can compile the platform-independent code at runtime into the native code of the machine being used to host the virtual machine. Compiling the platform-independent code into the native code of the host machine can reduce the execution time of the program.

Virtual machines for object-oriented programming languages with dynamic class loading typically load the code of a class when a program resolves a symbolic reference to that class for the first time. The class needs to be initialized subsequently when the program uses it for the first time. Loading and initialization of a class are two separate events. Initialization of a class may never take place even though the class has been loaded. In the case of the Java programming language, the initialization of a class consists of executing some code, known as the class's static initializer, that brings the class's variables (also known as the static variables) to a well-defined initialized state. A virtual machine implementation may choose to set a class to the initialized state upon loading when no action is required to initialize that class. For instance, in the Java programming language, no action is required to initialize a class when this class has no declared static initialization sequence, and either no non-final static variables, or non-final static variables that are all declared to be set to a default value. In this case, a virtual machine implementation can benefit from setting such initialization-less classes to the initialized state upon class loading.

A class initialization barrier is a sequence of native instructions that calls the virtual machine's runtime to initialize a class if it is not already initialized. Class initialization barriers are included in the implementation of those platform-independent instructions that may result in the very first use of a class (in the case of the Java programming language, there are 4 such instructions: getstatic, putstatic, invokestatic, new). The implementation of a platform-independent instruction can come in two flavors: (i) as a sequence of instructions that is part of the implementation of an interpreter of platform-independent instructions, (ii) or as a sequence of instruction generated by a dynamic compiler of platform-independent instructions.

Because class initialization barriers need only to be executed once per class, it is common practice in the implementation of non-multitasking virtual machines to have recourse to code-rewriting techniques to remove the class initialization barriers and the overhead they induce. In other words, a class initialization barrier can simply be an instruction that calls the virtual machine runtime and that is removed, or replaced, by the runtime before returning to the call site.

A multitasking virtual machine (MVM) aims at saving processing and memory by sharing as much of the runtime representation of a class as possible among tasks executing programs that use the class. Targets for sharing include the meta-data describing the class, the platform-independent code of the class's methods, and the native code produced by the dynamic compiler. Code re-writing techniques can be harmful when code, whether it is platform-independent or produced by a runtime compiler, is shared between multiple tasks. For instance, rewriting native code to remove a class initialization barrier is incorrect when that code is shared between multiple tasks, since tasks that have not initialized the corresponding class may subsequently be given access to that class without the class being initialized first. Task re-entrant class initialization barriers that test the initialization state of a class for the current task must be used instead. However, these barriers may result in severe performance penalty, in particular, by preventing some useful optimization, such as method inlining.

What is needed is a method and an apparatus that provides the benefits of sharing dynamically compiled native code among tasks of a multitasking virtual machine while eliminating the overhead resulting from the use of task re-entrant class initialization barriers.

SUMMARY

One embodiment of the present invention provides a method that enables native code, dynamically compiled from platform-independent code by one task of a multitasking virtual machine, to be used by other, potentially concurrent, tasks. Such sharing of dynamically compiled code reduces both the amount of dynamic compilation performed by, and the memory footprint of each task. The dynamic compiler can produce two types of native code that can be shared among tasks: task re-entrant code, and class initialization dependent (CID) code. Task re-entrant code is guaranteed to be executable by any task, irrespective of the classes already initialized by the task. In order to achieve this, the dynamic compiler generates task re-entrant class initialization barriers anywhere in the code where a class might be used for the first time by a task (in the case of the Java programming language, a task re-entrant class initialization barrier must be generated before any sequence of instructions generated to implement any of the four bytecode instructions getstatic, putstatic, invokestatic and new.) When producing CID code, the compiler assumes that a task will execute this code only after the task has initialized all the classes from an initialized set associated with the code. This allows the compiler to avoid generating task re-entrant class initialization barriers for classes from this initialized set, which in turn may foster further optimizations, such as, in the case of the Java programming language, inlining of static methods, or inlining of methods that include access to static variables of a class. The runtime of the system must guarantee that a task uses CID code only when all the classes of the initialized set for this code have been initialized by the task.

In one embodiment of the present invention, the system maintains only one version of dynamically compiled native code per method of a class, which may be either task re-entrant or class initialization dependent. Upon invocation of a class method without native code, the method's platform-independent code is interpreted, irrespective of the task invoking the method. After a threshold number of interpreted invocations, the dynamic compiler is invoked to build CID native code for the method. Upon invocation of a class method set with CID code, the native code is executed only for those tasks that have already initialized all the classes specified in the initialized set of the native code; for all other tasks, the method's platform-independent code is interpreted. If a task fails to initialize all the classes of the initialized set of the CID code of a method after a threshold of the number of invocations of that method, a task re-entrant version of the native code of the method is produced to replace its CID code. Upon invocation of a class method set with task re-entrant native code, the native code is executed, irrespective of the task invoking the method.

In one embodiment of the present invention, the system maintains two versions of dynamically compiled native code per method of a class, one that is task re-entrant, and the other that is class initialization dependent. Upon invocation of a method without native code, the method's platform-independent code is interpreted, irrespective of the task invoking the method. After a threshold number of interpreted invocations, the dynamic compiler is invoked to build CID native code for the method. Upon invocation of a class method set with CID code, the native code is executed only for those tasks that have already initialized all the classes specified in the initialized set of native code; for all other tasks, if the method also includes task re-entrant native code, this one is executed. Otherwise, the method's platform-independent code is interpreted. After a threshold of the number of invocations of a method without task re-entrant native code but with CID code, if a task fails to initialize all the classes of the initialized set of the CID code, task re-entrant native code is produced for the method and added to it. The CID native code of a method that also has task re-entrant native code is replaced with another CID produced with a different initialized set after a threshold number of invocations to the method that did not result in executing the CID native code. After a threshold number of such replacement of CID code, the method is set with task re-entrant native code only.

In one embodiment of the present invention, the system maintains more than one version of dynamically compiled native code per method of a class, wherein at least one version is task re-entrant, and the remaining versions differ by their initialized set and the optimizations they enabled.

In one embodiment of the present invention, the initialized set used to build CID native code for a method is the intersection of the set of classes already initialized by the task that triggered the compilation with the set of classes whose initialization may be triggered by the method to be compiled.

In one embodiment of the present invention, the initialized set used to build CID native code for a method is the set of all the classes whose initialization may be triggered by the method to be compiled.

In one embodiment of the present invention, the initialized set used to build CID native code for a method is the intersection of each of the set of classes already initialized by all the running tasks and of the set of classes whose initialization may be triggered by the method to be compiled.

In one embodiment of the present invention, the initialized sets of the CID native code of methods of the same class are the same, so that a call from the CID native code of a method to the CID native code of another method of the same class does not need testing beforehand, if the invoking task has initialized all the classes of the initialized set of the second method.

In one embodiment of the present invention, when the overall size of compiled code storage hits a threshold of consumed space, the runtime of the system can remove the CID native code from the method when the method also includes task re-entrant native code. All subsequent invocations of the method result in executing the task re-entrant native code, irrespective of classes already initialized by the invoking task.

In one embodiment of the present invention, only methods that include a number of class initialization barriers greater than a threshold are candidates for compilation into CID native code. Otherwise, these methods are compiled directly into task re-entrant native code.

DETAILED DESCRIPTION

The following description is presented to enable any person skilled in the art to make and use the invention, and is provided in the context of a particular application and its requirements. Various modifications to the disclosed embodiments will be readily apparent to those skilled in the art, and the general principles defined herein may be applied to other embodiments and applications without departing from the spirit and scope of the present invention. Thus, the present invention is not intended to be limited to the embodiments shown, but is to be accorded the widest scope consistent with the principles and features disclosed herein.

The data structures and code described in this detailed description are typically stored on a computer readable storage medium, which may be any device or medium that can store code and/or data for use by a computer system. This includes, but is not limited to, magnetic and optical storage devices such as disk drives, magnetic tape, CDs (compact discs) and DVDs (digital versatile discs or digital video discs), and computer instruction signals embodied in a transmission medium (with or without a carrier wave upon which the signals are modulated). For example, the transmission medium may include a communications network, such as the Internet.

Computing Device

Figure 1:
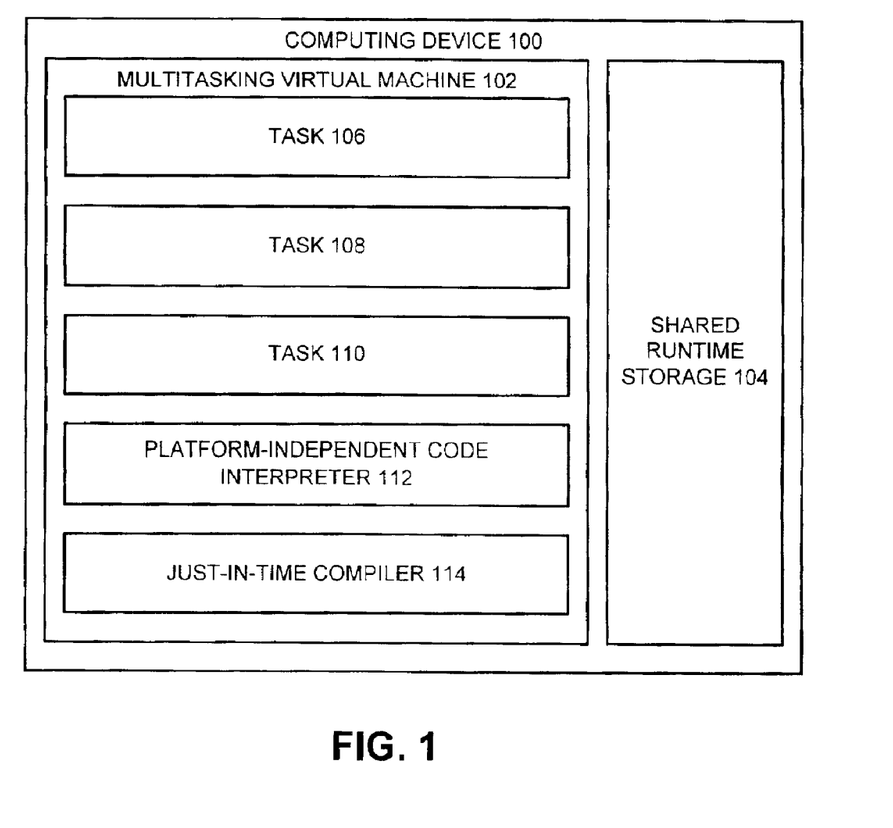
FIG. 1 illustrates computing device 100 in accordance with an embodiment of the present invention.

FIG. 1 illustrates computing device 100 in accordance with an embodiment of the present invention. Computing device 100 can generally include any type of computer system, including, but not limited to, a computer system based on a microprocessor, a mainframe computer, a digital signal processor, a portable computing device, a personal organizer, a device controller, and a computational engine within an appliance. Computing device 100 includes multitasking virtual machine 102.

Multitasking virtual machine 102 executes platform-independent code on behalf of multiple tasks such that each task is provided with the illusion that it is the only task being executed. Multitasking virtual machine 102 includes shared runtime storage 104, tasks 106, 108, and 110, platform-independent code interpreter 112, and dynamic compiler 114. Note that multitasking virtual machine 102 may include more or less tasks than the number shown.

Shared runtime storage 104 contains the runtime data structures that can be shared among the tasks executed by multitasking virtual machine 102. Data structures that make the shared runtime representation of classes, such as, platform-independent code of class methods, dynamically compiled native code for class methods, and other class information (e.g., in the case of the java programming language, the constant pool, the field, method, and interface arrays, etc) are stored in the shared runtime storage. Tasks 106, 108, and 110, maintain what is private to them in their respective private storage area. The initialization states of the classes used by a task and their static variables are example of task private data. Platform-independent code interpreter 112 interprets the platform-independent code for tasks 106, 108, and 110. Dynamic compiler 114 serves the requests issued by the runtime of virtual machine 102 to compile platform-independent code to native code of computing device 100. Converting the platform-independent code to the native code of computing device 100 can increase the efficiency and throughput of computing device 100. Typically, dynamic compiler 114 converts the platform-independent code to the native code of computing device 100 after a threshold number of invocation of the platform-independent code. Since converting the platform-independent code to the native code of computing device 100 is a costly process in terms of processing time, the use of dynamic compiler 114 is delayed to ensure that the cost of conversion will be recovered in the faster execution time of the platform-independent code. Conversion to native code by dynamic compiler 114 is performed on a method-by-method basis (i.e., some class methods may be converted to native code by the dynamic compiler and some may not be converted).

The native code generated by dynamic compiler 114 may be either task re-entrant or class initialization dependent. Both type of native code are stored in shared runtime storage.

Code Progression

Figure 2:
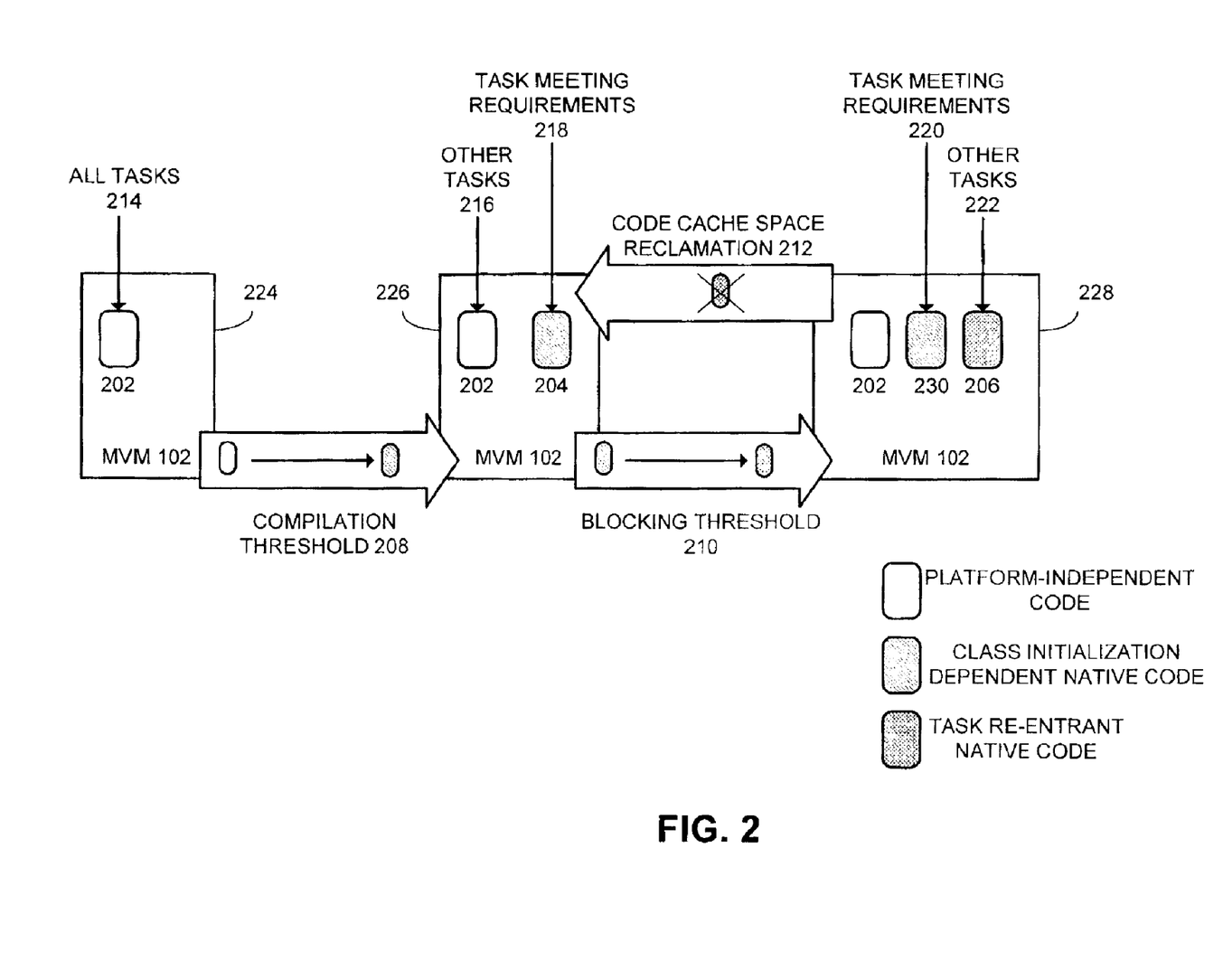
FIG. 2 is a diagram illustrating the evolution of the representation of a shared class method, initially with platform-independent code, then augmented with CID native code and task re-entrant native code in accordance with an embodiment of the present invention.

FIG. 2 is a diagram illustrating the state transitions of a class method and the event that triggers each state transition, in accordance with an embodiment of the present invention. Multitasking virtual machine 102 sets method 200 to the initial state 224 upon loading of the class that defines method 200. In initial state 224, all invocations of method 200, irrespective of the task carrying the invocation, result in interpreting the corresponding platform-independent code 202. Multitasking virtual machine 102 keeps track of the number of times method 202 has been interpreted.

After the number of interpreted invocations of method 200 reaches the compilation threshold 208, dynamic compiler 114 converts platform-independent code 202 into CID native code 204 using an initialized set that enumerates a set of classes that the compiler must assume initialized. Dynamic compiler 114 uses the initialized set to avoid generating task re-entrant class initialization barriers directed to any of the classes in the initialized set. After creation of CID native code 204, multitasking virtual machine 102 sets method 200 into state 226. In state 226, invocations to method 200 result in interpretation of platform-independent code 202, if at least one of the classes in the initialized set of CID native code 204 is not initialized by the invoking task. Otherwise, the invocation of method 200 results in executing CID native code 204. Multitasking virtual machine 102 keeps track of the number of times each task interprets method 200 in state 226.

Some tasks may not reach a state quickly enough where they can use CID native code 204. Multitasking virtual machine 102 detects this situation by examining the number of times the invoking task has interpreted method 200 before each interpretation of method 200. If the number of times is greater than a blocking threshold 210, the dynamic compiler is requested to produce task re-entrant native code 208. This can be done either by converting platform-independent code 202, or by modifying a copy of CID native code 204. The latter is usually substantially faster, because it does not involve complex compiler analysis. Instead, instructions corresponding to task re-entrant class initialization barriers are inserted at locations previously recorded during the building of CID native code 204. Inserting such instructions may cause further updates because of code relocation (i.e., branch instruction may need updates as well). However, even with these complications, the cost of updating a copy of CID native code remains substantially cheaper than recompiling the corresponding platform-independent code. After creation of task re-entrant native code 206, multitasking virtual machine 102 sets method 200 into state 228. In state 228, invocations to method 200 result in execution of task re-entrant native code 206, if at least one of the classes in the initialized set of CID native code 204 is not initialized by the invoking task. Otherwise, the invocation of method 200 results in execution of CID native code 204.

In state 228, several versions of optimized native code may exist, each with unique requirements for use. Additional versions of optimized native code depend upon having available space within memory 104. If space is needed within memory 104 for additional classes, the additional versions of optimized native code and un-optimized native code 206 can be removed by code cache space reclamation 212, returning the system to state 226. The favored combination is one that maintains at most two versions of native code per method, one of which is task re-entrant.

Selection of Code to Execute

Figure 3:
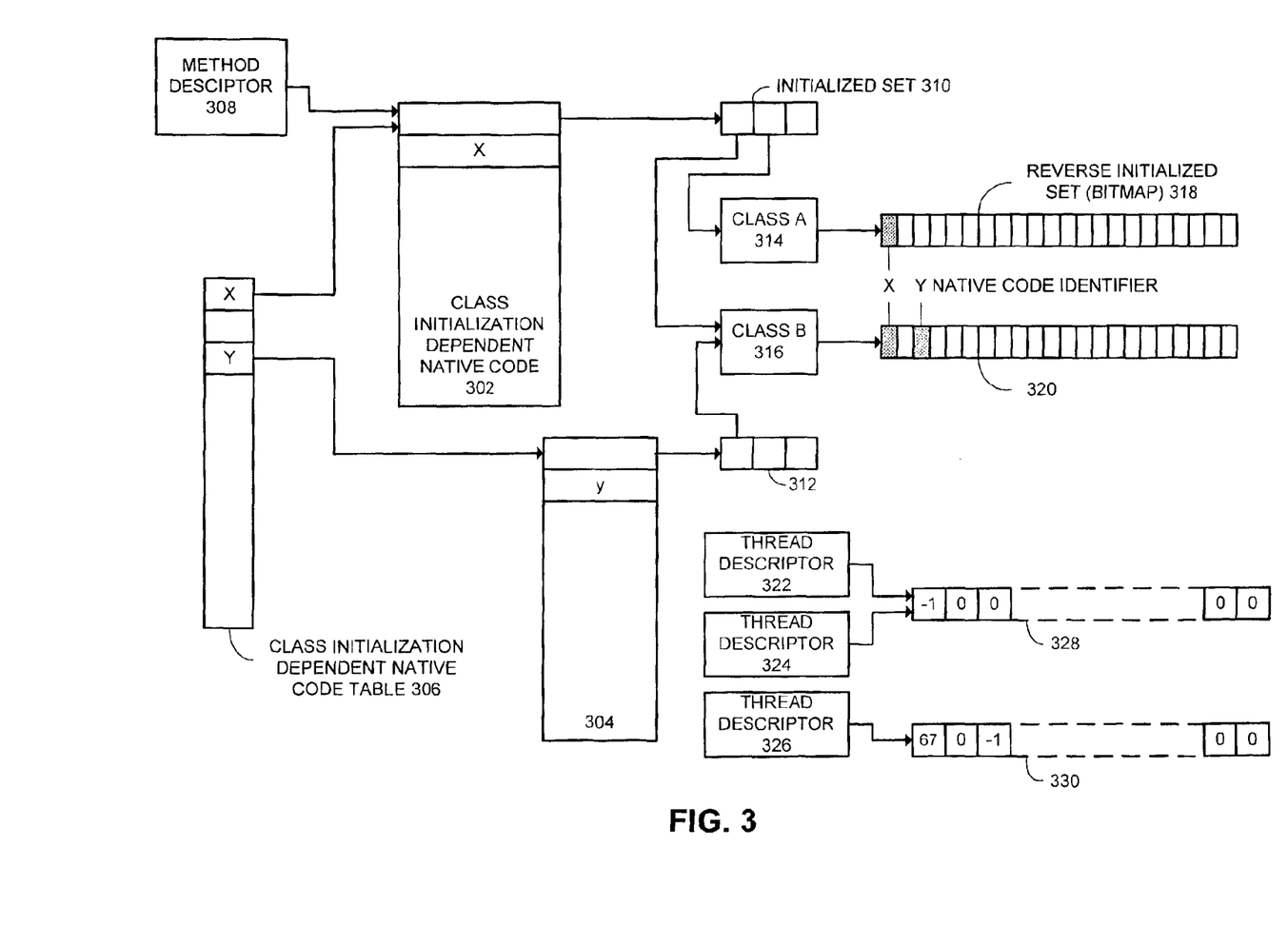
FIG. 3 illustrates the data structures for keeping track of the CID native code each task can use in accordance with an embodiment of the present invention.

FIG. 3 illustrates an example of data structures maintained by an implementation of a multitasking virtual machine to keep track of the CID native code that each task can execute. All CID native codes are recorded in CID native code table 306. The index to the entry of table 306 that records a CID native code is used also to uniquely identify that CID native method. The header of a CID native code (e.g., native code 302 and 304) includes its unique identifier, and a pointer to the initialized set used to build the CID native code. The initialized set of a CID code can be implemented as an array of pointers to shared runtime representation of classes (e.g., initialized sets 310 and 312 for CID native code 302 and 304, respectively). Classes that belong to at least one initialized set of a CID native code are associated with a reverse initialized set, typically implemented as a bitmap for compactness. The reverse initialized set of a class records which CID native codes include that class in their initialized set. Reverse initialized set bitmaps have as many bits as there are entries in CID native code table 306. The unique identifier of a CID native code is used to index the bitmaps that implement reverse initialized sets. For instance, CID native code 304 is recorded in entry Y of table 306, and includes class 316 in its initialized set; the bit at position Y in the reverse initialized set 320 associated with class 316 is set to 1 to indicate that class 316 is in the initialized set of native code CID 304 whose identifier is Y. Additionally, each task maintains an array of invocation counters that keeps track of the number of invocations of a method set with CID native code that did not result in executing that CID native code. As for the reverse initialized sets, these arrays of counters have as many entries as the CID native code table 306, and the unique identifier of a CID native code is used to index the arrays to obtain the invocation counter of a task for that native code. Each thread running on behalf of a particular task holds in its descriptor a pointer to the array of counters of their task. A negative counter value indicates that the task has initialized all the classes of the initialized set of the corresponding CID native code, and therefore, invocation to the corresponding method can execute the CID native code. For instance, invocations of method 308 issued by threads 322 and 324 result in executing CID native code 302, as indicated by entry X of counter array 328. However, invocations of method 308 issued by thread 326 result in either interpreting the platform-independent code for method 308, or task re-entrant native code, depending on the state of method 308.

Figure 4A:
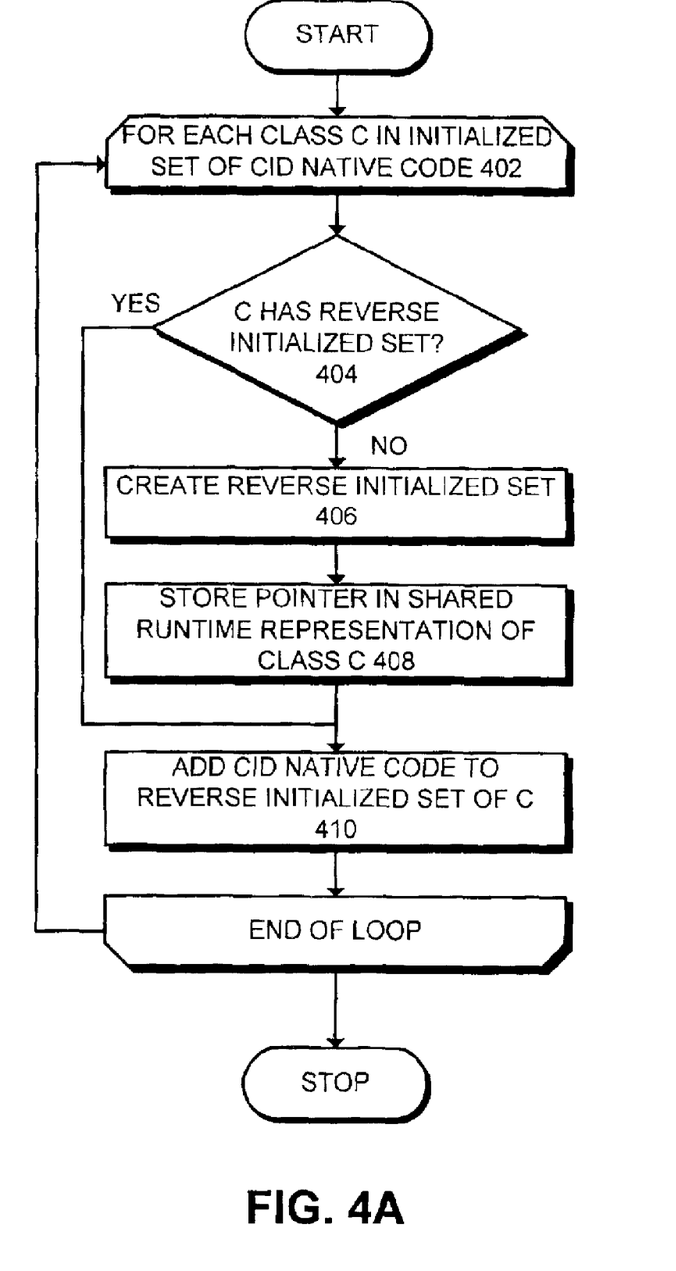
FIG. 4A is a flowchart illustrating how reversed initialized sets are created, and updated after creation of CID native code.

FIG. 4A is a flowchart illustrating how reversed initialized sets are created, and updated after creation of CID native code. When the dynamic compiler builds a CID native code, it adds the CID native code to the reverse initialized set of each of the classes of its initialized set. For each such class, it first tests whether the shared runtime representation of the class is already associated with a reverse initialized set (step 404). If not, one is created (step 406), and its pointer stored in the shared runtime representation of the class (step 408). The identifier of the CID native code is then added to the reverse initialized set (step 410).

Figure 4B:
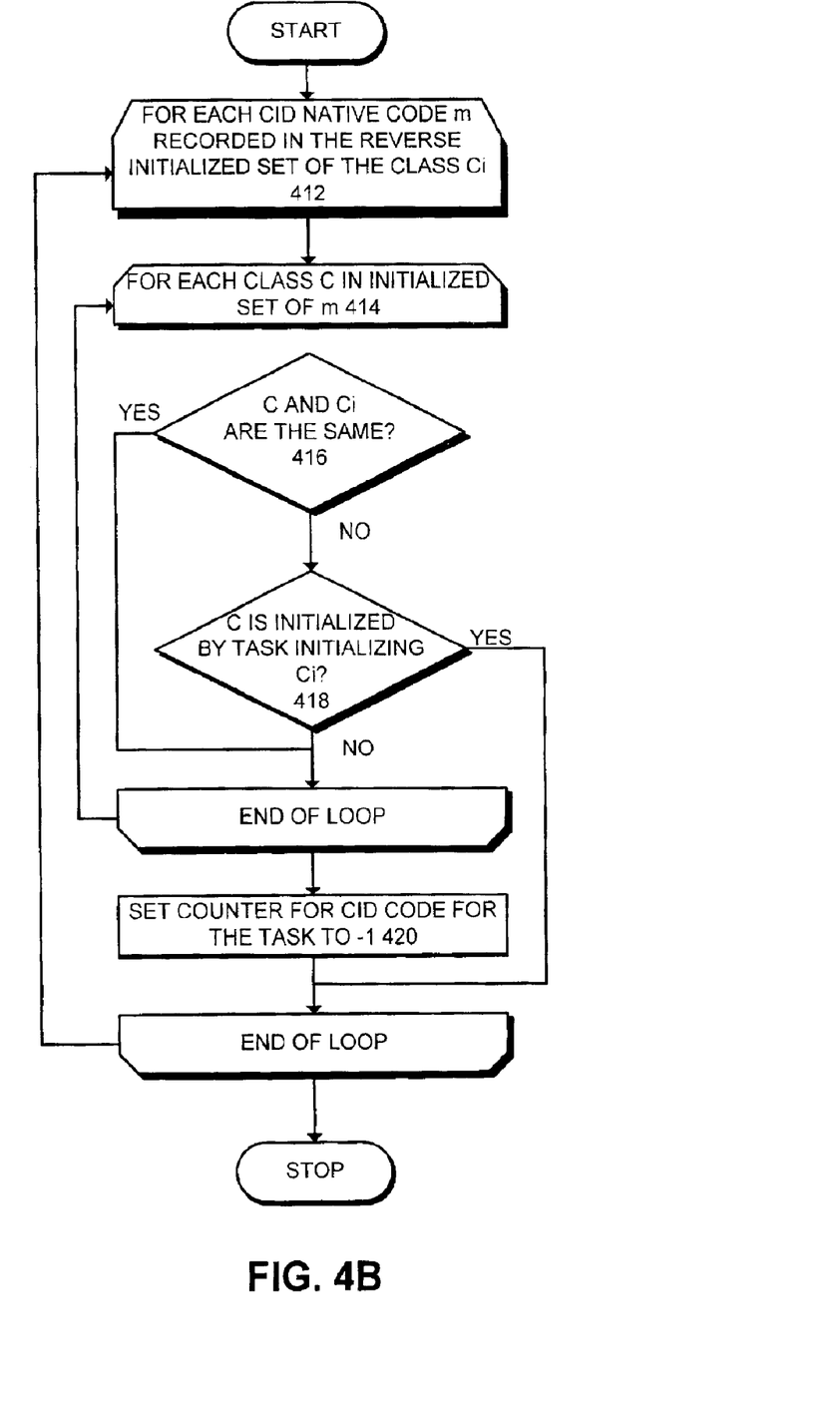
FIG. 4B is a flowchart illustrating the action performed upon initialization of a class by a task to update information that keeps track of what CID native code can be used by that task in accordance with an embodiment of the present invention.

FIG. 4B is a flowchart illustrating the action performed upon initialization of a class by a task to update information that keeps track of what CID native code can be used by that task in accordance with an embodiment of the present invention. Upon initialization of a class by a task, the multitasking virtual machine scans the reversed map of the class to find all the CID native code that include that class in their initialized set (step 412). The initialized set of each such CID native code is then scanned (step 414) to determine if all the classes in the set, other than the one being initialized, are already initialized (step 416 and 418). If this is the case, the counter corresponding to that CID native method for the initializing task is set to −1 to indicate that from now on, invocations of the corresponding method by the threads of that task can execute the CID native code (step 420).

Figure 5:
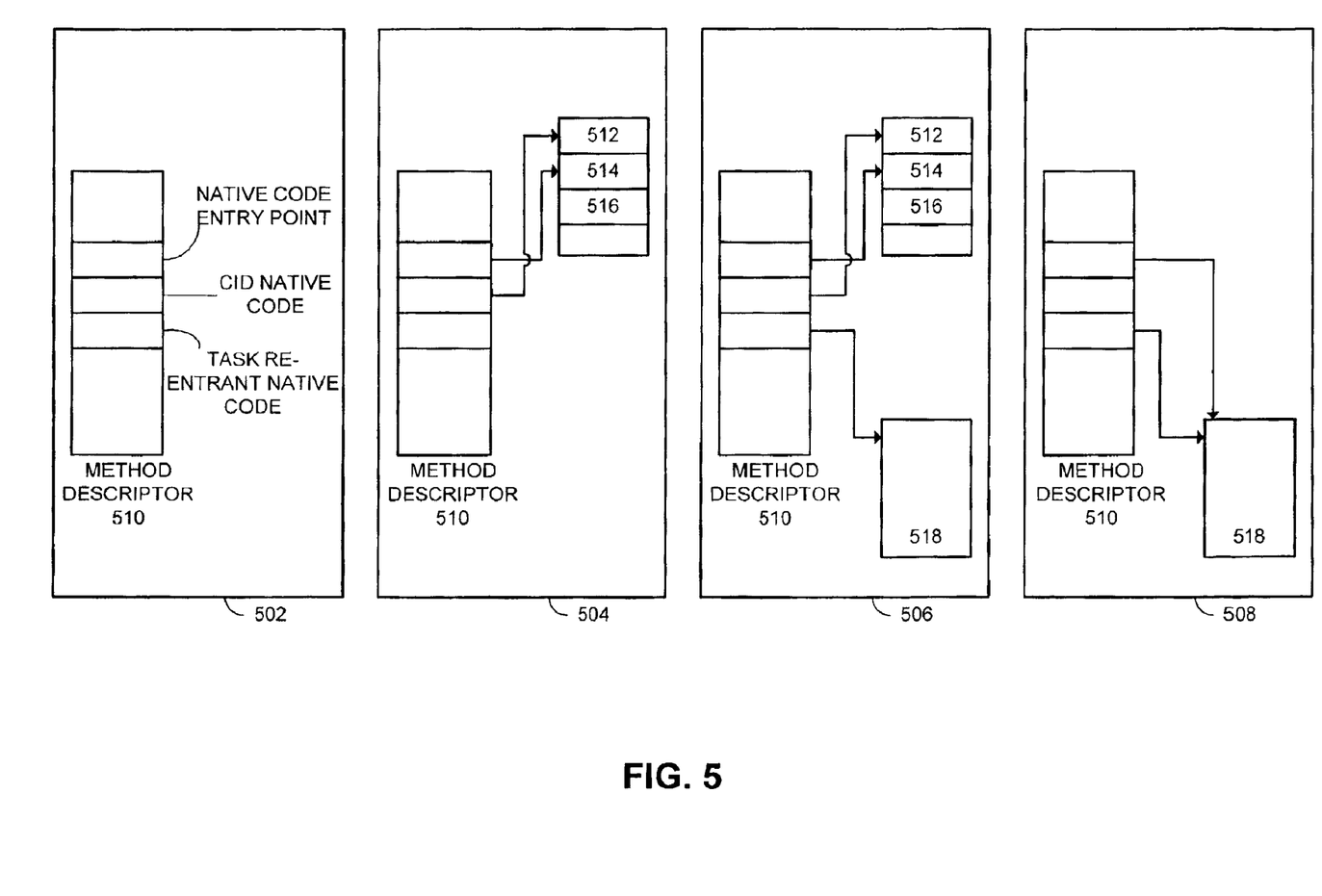
FIG. 5 illustrates how method descriptors keep track of what native code entry point to use upon invocation of the corresponding method in accordance with an embodiment of the present invention.

FIG. 5 illustrates how method descriptors encode the state of a method and indicate where to transfer control to execute the method upon its invocation. The native code to execute upon invocation is indicated by a native code entry point field in the descriptor of the method. The dynamic compiler uses the code entry point field to generate call instructions that implement invocation to that method; the interpreter uses the code entry point field to determine when native code is available, and which entry point to native code it should use; and the runtime of the dynamic compiler uses the code entry point field to update, upon method invocation, call sites that became obsolete because of a transition of the state of the invoked method. When method 510 has no native code, the native code entry point field is set to null, indicating that control must be transferred to the interpreter, which will execute the platform-independent code of method 510. When a method has only one native code (whether it is task re-entrant as when method 510 is in state 508, or class initialization dependent, as when it is in state 504), invocations of the method always results in executing the entry point of the native code. When a method has both task re-entrant and CID native code (as when method 510 is in state 506), its invocation always results in executing an entry point of its CID native code. In all cases, CID native code is responsible for determining whether it can be used by the task that performs the invocation. CID native code 512 for method 502 contains two guarded entry points: guarded entry point 514 is used when the method does not have task re-entrant native code in addition to its CID native code 510; guarded entry point 516 is used when the method also has task re-entrant native code 510. In addition to the guarded entry point, an unguarded entry point is also available when testing whether the invoking thread can use the CID native code is unnecessary. This third entry point is entered from the two guarded entry points. It may also be entered directly when the invoker method has the same, or a superset, of the initialized set of the invoked CID code. For instance, a dynamic compiler may choose to compile all methods of a given class with the same initialized set. In this case, all invocations from the CID native code of a method of a class to the CID native code of another method of the same class can use the unguarded entry. Similarly, recursive invocation can use the unguarded entry directly.

Figure 6A:
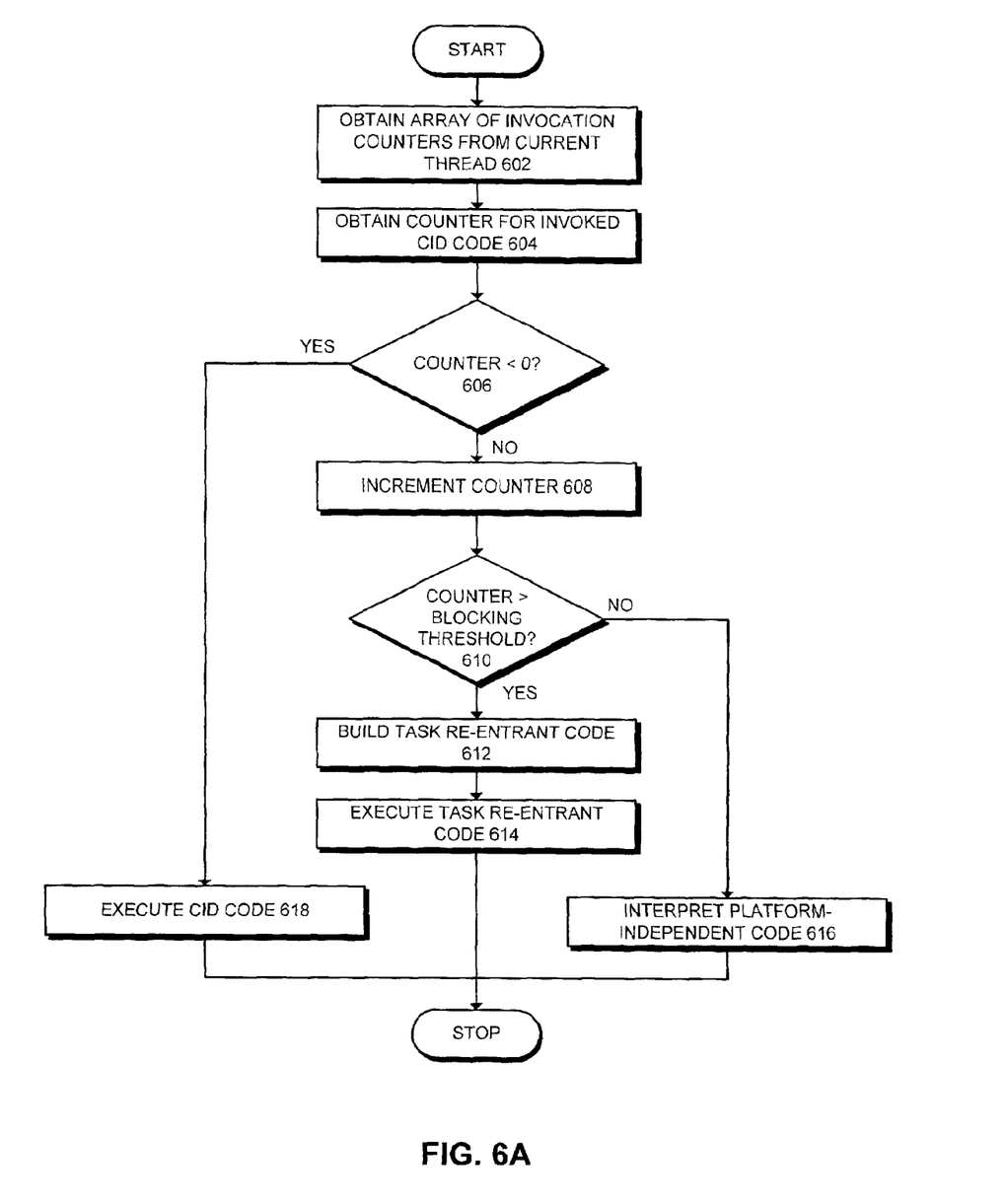
FIG. 6A is a flowchart illustrating the actions performed upon entering the CID native code of a method in order to decide whether the current task can execute the CID native code or must interpret the platform-independent code of the method in accordance with an embodiment of the present invention.

FIG. 6A is a flowchart illustrating the actions performed upon entering the CID native code of a method without task re-entrant native code. In this case, the guarded entry point must determine whether the task on behalf of which the current thread runs has initialized all the classes of the initialized set of the CID native method. This is accomplished by examining the invocation counter that corresponds to the CID native code. The array of invocation counters for CID native code for the current task is first obtained from the descriptor of the current thread (step 602). The appropriate counter is then obtained from this array by indexing the array with the unique identifier of the CID native code (step 604). The value of the counter is then tested (step 606). A negative value means that the task has initialized all the classes listed in the initialized set of the CID native code, and the thread can execute the CID native code (step 618). Otherwise, the counter is incremented (step 608), and its value compared with that of a blocking threshold (step 610). If the counter is greater than the threshold, the dynamic compiler is invoked to build task re-entrant native code for the method (step 612), and execution is transferred to this task re-entrant native code (step 614). Otherwise, control is transferred to the interpreter, which executes the method's platform-independent code (step 616). Note that once the task re-entrant code is built, the native code entry point encoded in the method descriptor is modified to refer to the second guarded entry point of the CID native code, whose actions are described below in conjunction with FIG. 6B.

It is possible that all the classes in the initialized set of a CID native code have been initialized by a task, but that that task's counter for this CID native code was not set to −1 to indicate so. This situation can happen when the CID native code is created by another task, after the first task has initialized all the classes of the initialized set of the CID native code. The counter is not updated in this case because determining all the tasks that have initialized all the classes of the initialized set of the CID code can be expensive. Instead, the runtime waits for a task in this situation to reach the blocking threshold to test again the initialization status of the classes in the initialized set of the CID code for the task. If the task has initialized all the classes, its counter for the CID code is set to −1 and the method invocation resumes by executing the CID native code.

Below is a sequence of assembler code for SPARC™ V9 processors that corresponds to the action described in the flowchart of FIG. 6A. SPARC is a trademark or registered trademark of SPARC International, Inc. in the United States and other countries. Note that the tasks that can execute the CID native code pay only the overhead of the first four instructions of the entry point (to test if the task has initialized all the classes in the initialized set of the CID native code). This corresponds to the overhead of a single task re-entrant class initialization barrier. The remaining instructions are executed only when the method must be interpreted, and processing overhead is not as crucial for performance in this case. Note also the use of an atomic compare-and-swap (cas) instruction to update the invocation counter, in order to avoid race conditions with class initialization code that may set the counter to −1 upon initialization of the last non-initialized class of the initialized set of the CID native code. Immediately after the cas instruction, the exchanged value of the counter is tested again in case a concurrent thread did change the counter to indicate that the task can now use the CID native code.

Figure 6B:
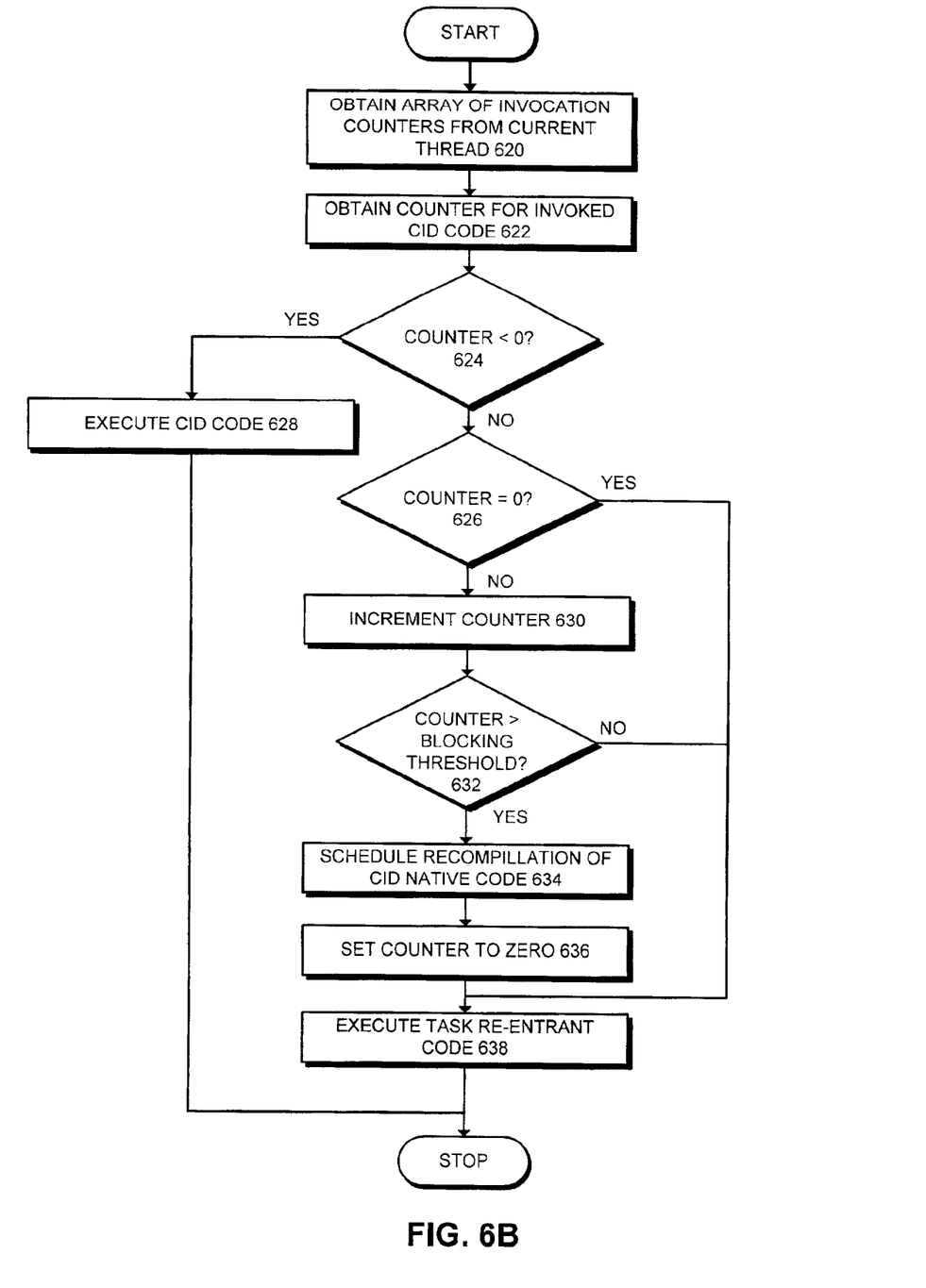
FIG. 6B is a flowchart illustrating the actions performed upon entering the CID native code of a method in order to decide whether the current task can execute the CID native code or must execute the task re-entrant native code of the method in accordance with an embodiment of the present invention.

1. ld [r_thread+offset_to_counter_table], r_table
2. mov IDENTIFIER, r_index
3. ld [r_table+r_index], r_counter
4. brlz, r_counter, unguarded_cid_entry_point
5. nop
6. add r_counter,1, r_new_counter
7. sethi hi(interpreter_entry_point), r_iep
8. cas [r_table+r_index], r_counter, new_counter
9. brlz new_counter, unguarded_cid_entry_point
10. nop
11. set BLOCKING_THRESHOLD1, rb
12. cmp rb, new_counter
13. be call_dynamic_compiler
14. nop
/* jump to the interpreter entry point*/
15. jmp r_iep+low(interpreter_entry_point)
16. nop FIG. 6B is a flowchart illustrating the actions performed upon entering the CID native code of a method that also has task re-entrant native code. As before, the entry point must determine whether the task on behalf of which the current thread runs has initialized all the classes of the initialized set of the CID method. This is determined as in the other guarded entry point. The array of invocation counters for CID native code for the current task is first obtained from the descriptor of the current thread (step 620). From this array, the counter for the CID native code is then obtained by indexing the array with the unique identifier of the CID native code (step 622). The value of the counter is then tested (step 624). A negative value means that the task has initialized all the classes listed in the initialized set of the CID native code, and the thread can execute the CID native code (step 628). Otherwise, if the counter has a value of 0, control is immediately transferred to the available task re-entrant native code (step 626), which is then executed (step 638). Otherwise, the counter is incremented (step 630), and its value tested against a blocking threshold of the number of invocations of the method that could not result in executing its CID native code (step 632). If the counter's value is below the threshold, control is transferred to the available task re-entrant native code (step 638). Otherwise, a request to asynchronously recompile the CID native code is issued to the dynamic compiler (step 634), the counter is set to 0 so that subsequent invocations directly result in executing the task re-entrant code of the method (step 636), and the task re-entrant code is executed (step 638). Note that in case the blocking threshold is hit, the invoker does not wait for the CID native code to be recompiled. The decision to recompile the method is ultimately taken by the dynamic compiler based on the feedback obtained from execution. For instance, it may be that only one task over a long period of time has hit the blocking threshold. In this case, the dynamic compiler may ignore the request submitted by that task since it does not benefit the majority of tasks that used that method. For this reason, the request is submitted asynchronously, and a shorter path to executing the task re-entrant code is created by setting the invocation counter of the task to 0.

Below is a sequence of assembler code for SPARC™ V9 processors that corresponds to the action described in the flowchart of FIG. 6B. As before, the tasks that can execute the CID native code pay only the overhead of the first four instructions of the guarded entry point. Tasks that have reached the blocking threshold pay an additional overhead of three instructions (instructions 6, 7, and 16) upon every invocation of the method. Note that the blocking threshold in this case can be much smaller than for the other entry points since it may pay off much earlier to switch to task re-entrant native code (since the switching does not involve any heavyweight compilation cost, as opposed to the case when the method does not have already task re-entrant native code).

1. ld [r_thread+offset_to_counter_table], r_table
2. mov IDENTIFIER, r_index
3. ld [r_table+r_index], r_counter
4. brlz, r_counter, unguarded_cid_entry_point
5. nop
6. brz, r_counter, execute_task_reentrant_code
7. sethi hi(task_reentrant_entry_point), r_trep
8. add r_counter,1,r_new_counter
9. cas [r_table+r_index], r_counter, new_counter
10. brlz new_counter, unguarded_cid_entry_point
11. nop
12. set BLOCKING_THRESHOLD2, rb
13. cmp rb, new_counter
14. be call_dynamic_compiler
15. nop
execute_task_reentrant_code:
16. jmp r_trep, low(task_reentrant_entry_point)
17. nop Choice of an Initialized Set When building CID native code, the dynamic compiler should choose an initialized set such that the code produced can be immediately used, at least by the task that requested the dynamic compilation. In other words, the chosen initialized set should be a subset of the set of classes already initialized by the task on behalf of which the compilation takes place. The initialized set must also be a subset of the comprehensive initialized set of the method being compiled, which is the set of all the classes whose initialization can be triggered by that method. Thus, a good compromise for an initialized set is the intersection between the set of classes already initialized by the task requesting the dynamic compilation (i.e., the requester), and the comprehensive initialized set of the method. This intersection can be determined by first computing the comprehensive initialized set of the method, then iterating over it to find which ones have been initialized by the requester, and adding them to the initialized set.

The comprehensive set of methods can be simply obtained by iterating over all the instructions of the platform-independent code of the method, and for each method requiring a class initialization barrier, add the targeted class to the comprehensive initialized set. Computation of the comprehensive initialized set can be made opportunistically, at times when the platform-independent code is already being iterated over. For instance, in the case of the Java programming language, the JVM performs an abstract interpretation of the platform-independent code to verify it. Verification can be modified to also compute the comprehensive initialized set of all the methods of a classes.

Dynamic compilers commonly start with building an intermediate representation of the code they compile in order to ease subsequent code analysis and optimization phases. Building the intermediate representation requires iterating over all the instructions of the platform-independent code of the method, and is a better place to build the comprehensive initialized set of a method. Thus, the comprehensive initialized set can be computed while building the intermediate representation, and the initialized set can be determined once the intermediate representation is built, just before the optimization and analysis phases of the compilation where the initialized set can be used.

Note that while building native code, the dynamic compiler may identify classes for which the compiled method will never trigger an initialization class. Such classes are removed from both the comprehensive initialized set and the initialized set actually used.

The foregoing descriptions of embodiments of the present invention have been presented for purposes of illustration and description only. They are not intended to be exhaustive or to limit the present invention to the forms disclosed. Accordingly, many modifications and variations will be apparent to practitioners skilled in the art. Additionally, the above disclosure is not intended to limit the present invention. The scope of the present invention is defined by the appended claims.

What is claimed is:

1. A method to facilitate sharing of dynamically compiled native code among multiple tasks of a multitasking virtual machine, comprising:

upon invocation by a task among multiple tasks of a program method not associated with native code, executing a platform-independent code of the program method, wherein the platform-independent code is shared among multiple tasks, and wherein an interpreter is re-entrant so that the task can use the interpreter to execute the platform independent code; and compiling the platform-independent code to one of a task re-entrant native code and a class initialization dependent native code after a first threshold number of executions of the platform-independent code, wherein a native code is shared among multiple tasks, wherein the task re-entrant native code includes a task re-entrant class initialization barrier where a class may be used for a first time by the task, and wherein the class initialization dependent native code includes the task re-entrant class initialization barrier where the class that does not belong to an initialized set associated with the native code may be used for the first time by the task.

2. The method of claim 1, further comprising upon invocation by the task of a program method associated with one version of native code that is task re-entrant, executing the task re-entrant native code.

3. The method of claim 1, further comprising upon invocation by the task of a program method associated with one version of native code that is class initialization dependent, executing the class initialization dependent native code if the task has initialized all classes from the initialized set of the class initialization dependent native code, otherwise, interpreting the platform-independent code of the program method.

4. The method of claim 3, further comprising building task re-entrant native code after a second threshold number of executions by the task of the platform-independent code of the program method associated with class initialization dependent native code.

5. The method of claim 4, further comprising replacing the class initialization dependent native code with the task re-entrant native code.

6. The method of claim 4, further comprising associating the program method with the task re-entrant native code in addition to the class initialization dependent native code.

7. The method of claim 6, further comprising upon invocation by the task of the program method associated with both task re-entrant and class initialization dependent native code, executing the class initialization dependent native code if the task has initialized all classes from the initialized set of the class initialization dependent native code, otherwise, executing the task re-entrant code of the program method.

8. The method of claim 3, further comprising building another class initialization dependent native code after a second threshold number of executions by the task of the platform-independent code of the program method associated with class initialization dependent native code, and replacing initialization dependent native code of a first class with a new class initialization dependent native code, wherein the new class initialization dependent native code is associated with an initialized set different from a first class initialization dependent native code.

9. The method of claim 3, further comprising:
associating a shared representation of the class with a reverse initialized set that records class initialization dependent native code that includes the class in their initialized set; and
associating the task with an array of invocation counters;
wherein an invocation counter of the array of invocation counters with a positive counter value indicates both that the task has not initialized all classes of the initialized set of the class initialization dependent native code of the program method associated with the invocation counter, and a number of invocations of the program method by the task that did not execute the class initialization dependent native code of the program method; and
wherein a specified negative value of the invocation counter indicates that the task has initialized all classes in the initialized set of the class initialization dependent native code of the program method and can execute the class initialization dependent native code upon invocation of the program method.

10. The method of claim 9, further comprising associating the shared representation of the class with the reverse initialized set upon first addition of the class to the initialized set of the class initialization dependent native code of a program method.

11. The method of claim 9, further comprising adding the class initialization dependent native code that includes the class in its initialized set to the reverse initialized set of the class upon creation of the class initialization dependent native code.

12. The method of claim 9, further comprising upon initialization of the class by the task, setting for each class initialization dependent native code of the reverse initialized set of the class a corresponding invocation counter in the array of invocation counters of the task to the specified negative value if all classes in the initialized set of the class initialization dependent native code, excluding the class, are initialized.

13. The method of claim 9, further comprising:
upon invocation by the task of the program method associated with the class initialization dependent native code, testing a value of the invocation counter of the array of invocation counter of the task that corresponds to the class initialization dependent native code; and
if the value of the invocation counter is negative, executing the class initialization dependent native code.

14. The method of claim 1, wherein the initialized set used to build the class initialization dependent native code for the program method is an intersection of classes already initialized by a first task to reach the first threshold number of executions of the platform-independent code, and a set of classes whose initialization can be triggered by the program method to be compiled.

15. The method of claim 1, wherein the initialized set used to build the class initialization dependent native code for the program method is a set of all classes whose initialization may be triggered by the program method to be compiled.

16. The method of claim 1, wherein the initialized set used to build class initialization dependent native code for the program method is an intersection of classes already initialized by one or more running tasks and classes whose initialization may be triggered by the program method to be compiled.

17. The method of claim 1, wherein the initialized set used to build a class initialization native code for all program methods of a particular class is identical, whereby the class initialization dependent native code of a first program method of the class can be executed without testing beforehand if an invoking task has initialized all classes of its initialized set when the first program method is invoked from the class initialization dependent native code of a second program method of the class.

18. The method of claim 1, further comprising if a space occupied by all dynamically compiled code exceeds a specified threshold, removing the class initialization dependent native code from the program method when the program method includes task re-entrant code.

19. The method of claim 1, wherein the program method that includes a number of class initialization barriers smaller than a specified threshold are dynamically compiled into task re-entrant native code only.

20. A computer-readable storage medium storing instructions that when executed by a computer cause the computer to perform a method to facilitate sharing of dynamically compiled native code among multiple tasks of a multitasking virtual machine, comprising:
upon invocation by a task among multiple tasks of a program method not associated with native code, executing a platform-independent code of the program method,
wherein the platform-independent code is shared among multiple tasks, and
wherein an interpreter is re-entrant so that the task can use the interpreter to execute the platform independent code; and
compiling the platform-independent code to one of a task re-entrant native code and a class initialization dependent native code after a first threshold number of executions of the platform-independent code,
wherein a native code is shared among multiple tasks,
wherein the task re-entrant native code includes a task re-entrant class initialization barrier where a class may be used for a first time by the task, and
wherein the class initialization dependent native code includes the task re-entrant class initialization barrier where the class that does not belong to an initialized set associated with the native code may be used for the first time by the task.

21. The computer-readable storage medium of claim 20, the method further comprising upon invocation by the task of a program method associated with one version of native code that is task re-entrant, executing the task re-entrant native code.

22. The computer-readable storage medium of claim 20, the method further comprising upon invocation by the task of a program method associated with one version of native code that is class initialization dependent, executing the class initialization dependent native code if the task has initialized all classes from the initialized set of the class initialization dependent native code, otherwise, interpreting the platform-independent code of the program method.

23. The computer-readable storage medium of claim 22, the method further comprising building task re-entrant native code after a second threshold number of executions by the task of the platform-independent code of the program method associated with class initialization dependent native code.

24. The computer-readable storage medium of claim 23, the method further comprising replacing the class initialization dependent native code with the task re-entrant native code.

25. The computer-readable storage medium of claim 23, the method further comprising associating the program method with the task re-entrant native code in addition to the class initialization dependent native code.

26. The computer-readable storage medium of claim 25, the method further comprising upon invocation by the task of the program method associated with both task re-entrant and class initialization dependent native code, executing the class initialization dependent native code if the task has initialized all classes from the initialized set of the class initialization dependent native code, otherwise, executing the task re-entrant code of the program method.

27. The computer-readable storage medium of claim 22, the method further comprising building another class initialization dependent native code after a second threshold number of executions by the task of the platform-independent code of the program method associated with class initialization dependent native code, and replacing initialization dependent native code of a first class with a new class initialization dependent native code, wherein the new class initialization dependent native code is associated with an initialized set different from a first class initialization dependent native code.

28. The computer-readable storage medium of claim 22, the method further comprising:
   associating a shared representation of the class with a reverse initialized set that records class initialization dependent native code that includes the class in their initialized set; and
   associating the task with an array of invocation counters;
   wherein an invocation counter of the array of invocation counters with a positive counter value indicates both that the task has not initialized all classes of the initialized set of the class initialization dependent native code of the program method associated with the invocation counter, and a number of invocations of the program method by the task that did not execute the class initialization dependent native code of the program method; and
   wherein a specified negative value of the invocation counter indicates that the task has initialized all classes in the initialized set of the class initialization dependent native code of the program method and can execute the class initialization dependent native code upon invocation of the program method.

29. The computer-readable storage medium of claim 28, the method further comprising associating the shared representation of the class with the reverse initialized set upon first addition of the class to the initialized set of the class initialization dependent native code of a program method.

30. The computer-readable storage medium of claim 28, the method further comprising adding the class initialization dependent native code that includes the class in its initialized set to the reverse initialized set of the class upon creation of the class initialization dependent native code.

31. The computer-readable storage medium of claim 28, the method further comprising upon initialization of the class by the task, setting for each class initialization dependent native code of the reverse initialized set of the class a corresponding invocation counter in the array of invocation counters of the task to the specified negative value if all classes in the initialized set of the class initialization dependent native code, excluding the class, are initialized.

32. The computer-readable storage medium of claim 28, the method further comprising:
   upon invocation by the task of the program method associated with the class initialization dependent native code, testing a value of the invocation counter of the array of invocation counter of the task that corresponds to the class initialization dependent native code; and
   if the value of the invocation counter is negative, executing the class initialization dependent native code.

33. The computer-readable storage medium of claim 20, wherein the initialized set used to build the class initialization dependent native code for the program method is an intersection of classes already initialized by a first task to reach the first threshold number of executions of the platform-independent code, and a set of classes whose initialization can be triggered by the program method to be compiled.

34. The computer-readable storage medium of claim 20, wherein the initialized set used to build the class initialization dependent native code for the program method is a set of all classes whose initialization may be triggered by the program method to be compiled.

35. The computer-readable storage medium of claim 20, wherein the initialized set used to build class initialization dependent native code for the program method is an intersection of classes already initialized by one or more running tasks and classes whose initialization may be triggered by the program method to be compiled.

36. The computer-readable storage medium of claim 20, wherein the initialized set used to build a class initialization native code for all program methods of a particular class is identical, whereby the class initialization dependent native code of a first program method of the class can be executed without testing beforehand if an invoking task has initialized all classes of its initialized set when the first program method is invoked from the class initialization dependent native code of a second program method of the class.

37. The computer-readable storage medium of claim 20, the method further comprising if a space occupied by all dynamically compiled code exceeds a specified threshold, removing the class initialization dependent native code from the program method when the program method includes task re-entrant code.

38. The computer-readable storage medium of claim 20, wherein the program method that includes a number of class initialization barriers smaller than a specified threshold are dynamically compiled into task re-entrant native code only.

39. An apparatus to facilitate sharing of dynamically compiled native code among multiple tasks of a multitasking virtual machine, comprising:
   an execution mechanism that is configured to execute a platform-independent code of a program method upon invocation by a task among multiple tasks of the program method not associated with native code,
   wherein the platform-independent code is shared among multiple tasks, and wherein an interpreter is re-entrant so that the task can use the interpreter to execute the platform independent code; and a compiling mechanism that is configured to compile the platform-independent code to one of a task re-entrant native code and a class initialization dependent native code after a first threshold number of executions of the platform-independent code, wherein a native code is shared among multiple tasks, wherein the task re-entrant native code includes a task re-entrant class initialization barrier where a class may be used for a first time by the task, and wherein the class initialization dependent native code includes the task re-entrant class initialization barrier where the class that does not belong to an initialized set associated with the native code may be used for the first time by the task.

40. The apparatus of claim 39, wherein the execution mechanism is further configured to execute the task re-entrant native code upon invocation by the task of a program method associated with one version of native code that is task re-entrant.

41. The apparatus of claim 39, wherein the execution mechanism is further configured to execute the class initialization dependent native code if the task has initialized all classes from the initialized set of the class initialization dependent native code, otherwise, interpreting the platform-independent code of the program method upon invocation by the task of a program method associated with one version of native code that is class initialization dependent.

42. The apparatus of claim 41, further comprising a code building mechanism that is configured to build task re-entrant native code after a second threshold number of executions by the task of the platform-independent code of the program method associated with class initialization dependent native code.

43. The apparatus of claim 42, further comprising a replacing mechanism that is configured to replace the class initialization dependent native code with the task re-entrant native code.

44. The apparatus of claim 42, further comprising an associating mechanism that is configured to associate the program method with the task re-entrant native code in addition to the class initialization dependent native code.

45. The apparatus of claim 44, wherein the execution mechanism is further configured to execute the class initialization dependent native code if the task has initialized all classes from the initialized set of the class initialization dependent native code upon invocation by the task of the program method associated with both task re-entrant and class initialization dependent native code, otherwise, executing the task re-entrant code of the program method.

46. The apparatus of claim 41, further comprising a code building mechanism that is configured to build another class initialization dependent native code after a second threshold number of executions by the task of the platform-independent code of the program method associated with class initialization dependent native code, and replacing initialization dependent native code of a first class with a new class initialization dependent native code, wherein the new class initialization dependent native code is associated with an initialized set different from a first class initialization dependent native code.

47. The apparatus of claim 41, further comprising:

an associating mechanism that is configured to associate a shared representation of the class with a reverse initialized set that records class initialization dependent native code that includes the class in their initialized set;

wherein the associating mechanism is further configured to associate the task with an array of invocation counters;

wherein an invocation counter of the array of invocation counters with a positive counter value indicates both that the task has not initialized all classes of the initialized set of the class initialization dependent native code of the program method associated with the invocation counter, and a number of invocations of the program method by the task that did not execute the class initialization dependent native code of the program method; and wherein a specified negative value of the invocation counter indicates that the task has initialized all classes in the initialized set of the class initialization dependent native code of the program method and can execute the class initialization dependent native code upon invocation of the program method.

48. The apparatus of claim 47, wherein the associating mechanism is further configured to associate the shared representation of the class with the reverse initialized set upon first addition of the class to the initialized set of the class initialization dependent native code of a program method.

49. The apparatus of claim 47, further comprising an adding mechanism that is configured to add the class initialization dependent native code that includes the class in its initialized set to the reverse initialized set of the class upon creation of the class initialization dependent native code.

50. The apparatus of claim 47, further comprising a setting mechanism that is configured to set for each class initialization dependent native code of the reverse initialized set of the class a corresponding invocation counter in the array of invocation counters of the task to the specified negative value if all classes in the initialized set of the class initialization dependent native code, excluding the class, are initialized upon initialization of the class by the task.

51. The apparatus of claim 47, further comprising:

a testing mechanism that is configured to test a value of the invocation counter of the array of invocation counter of the task that corresponds to the class initialization dependent native code upon invocation by the task of the program method associated with the class initialization dependent native code; and wherein the execution mechanism is further configured to execute the class initialization dependent native code if the value of the invocation counter is negative.

52. The apparatus of claim 39, further comprising a code removing mechanism that is configured to remove the class initialization dependent native code from the program method when the program method includes task re-entrant code if a space occupied by all dynamically compiled code exceeds a specified threshold.

* * * * *